Figure 1:
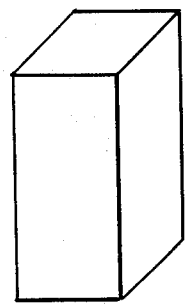

July 14, 1964    A. M. ALPER ETAL    3,140,955
FUSED CAST REFRACTORY
Filed Nov. 24, 1961

INVENTORS
ALLEN M. ALPER
AND ROBERT N. McNALLY

BY Clarence R. Patty, Jr.
ATTORNEY

United States Patent Office 3,140,955
Patented July 14, 1964

3,140,955
FUSED CAST REFRACTORY
Allen M. Alper, Horseheads, and Robert N. McNally, Corning, N.Y., assignors, by mesne assignments, to Cohart Refractories Company, a corporation of Delaware
Filed Nov. 24, 1961, Ser. No. 154,754
2 Claims. (Cl. 106—59)

This invention relates to magnesia-alumina-chromic oxide fused cast refractory and is particularly concerned with the provision of an improved refractory especially adapted for use in steelmaking furnaces and related apparatus.

Refractory brick for use in steelmaking furnaces, e.g., in open hearth furnace roofs, must be able to withstand a substantial temperature gradient within the brick from the hot face exposed to the furnace interior to the cold outermost face and cyclic temperature changes occurring with the production of each new heat of steel. The refractory brick must also be able to resist the detrimental effects of liquid slags and slag vapors at furnace temperatures. In the present day steelmaking processes utilizing increasingly greater quantities of tonnage oxygen and the resulting higher furnace temperatures, the detrimental effects of temperature gradient, temperature variation and hot slags or hot slag vapors on the refractory are increased to an even greater degree. The primary detrimental effect due to the temperature gradient and the cyclic temperature changes has been found to be spalling of chunks or sections of the brick from the hot face end. The detrimental effect of the hot ferruginous slags or slag vapors has been found to be either a corrosion-erosion wearing away effect on the hot face of the brick or a slag penetration and/or diffusion into the brick accompanied by an expansion of these slag constituents within the brick structure resulting in portions of the brick bursting off as small chunks or flakes.

Over two decades ago, it was proposed to use magnesia-alumina fused cast refractories having at least about 30% MgO for applications in the metallurgical industries where the refractories would have to withstand corrosive conditions. However, these magnesia-alumina refractories generally have been found to possess poor resistance to slag deterioration. Those having lower MgO contents, e.g., 50%, suffer from severe corrosion-erosion effects and those having higher MgO contents, e.g., 80%, suffer from severe bursting effects. Moreover, these prior magnesia-alumina fused cast refractories generally possess a relatively low modulus of rupture (strength) and they generally have an undesirably high thermal spalling tendency.

Fused cast refractories having an outstanding resistance to slag attack and a high modulus of rupture were subsequently developed. These consisted essentially of MgO, $Al_2O_3$, $Cr_2O_3$ and iron oxides, e.g., the refractory compositions disclosed in U.S. Patents 2,599,566 and 2,690,974 to R. J. Magri. However, service experience with these refractories under present day steelmaking practices, e.g., in open hearth furnaces, has shown a less than desirable resistance to thermal spalling.

It has now been discovered that the thermal spalling resistance of these latter fused cast refractories is greatly limited by the relatively large $Cr_2O_3$ and FeO contents (the total Fe content being calculated as FeO according to customary practice). Thus, it has been found that a fused cast refractory consisting essentially of a fused mixture of magnesia, alumina, a relatively very small quantity of chromic oxide and the substantial absence of FeO has a greatly improved resistance of thermal spalling while still possessing a resistance to slag deterioration and a modulus of rupture greatly superior to the early magnesia-alumina fused cast refractories.

Accordingly, it is an object of this invention to provide a new magnesia-alumina-chromic oxide fused cast refractory having an improved combination of properties comprising good modulus of rupture, good resistance to slag deterioration and outstanding resistance to thermal spalling.

In the drawing, FIGURES 1 through 5 illustrate a scheme of spalling defect classification for thermally cycled brick.

The improved fused cast refractory of this invention consists essentially of, by weight, the following on an oxide basis:

|   | Broad, percent | Preferred, percent |
|---|---|---|
| MgO | 56–85 | 60–75 |
| $Al_2O_3$ | 13–40 | 25–35 |
| MgO & $Al_2O_3$ | at least 90 | at least 92 |
| $Cr_2O_3$ | 0.4–4.5 | 0.7–4 |
| FeO [1] | up to 3.5 | up to 2.5 |
| CaO | up to 3 | up to 2 |
| $SiO_2$ | up to 3 | up to 2 |
| $B_2O_3$ | up to 0.5 | up to 0.2 |

[1] The total Fe content being calculated as FeO according to customary practice.

While it is desirable to make the fused cast refractory of the invention substantially all MgO, $Al_2O_3$ and $Cr_2O_3$ for an optimum combination of properties, it is not economically desirable because of the greater expense involved for pure oxide raw materials, particularly chromic oxide. Hence, less pure and less expensive raw materials can be utilized which provide no more than the above-stated limited quantities of optional constituents, i.e., FeO, CaO, $SiO_2$ and $B_2O_3$, and very minor impurities. Excessive quantities of FeO and $B_2O_3$ materially decrease the resistance to thermal spalling and excessive quantities of CaO and $SiO_2$ materially decrease the resistance to slag corrosion-erosion.

In the production of the refractory of this invention, raw materials of suitable purity are proportioned in accordance with the desired final composition and are preferably premixed prior to charging into the melting furnace. The batch material is then processed according to the well-known fusion casting techniques, for example, as disclosed in United States Patent 1,615,750 to G. S. Fulcher.

Examples of raw materials used and found suitable are shown below in terms of typical chemical analyses in weight percent:

| Calcined Magnesite | Alumina | Transvaal Chrome Ore |
|---|---|---|
| 98.0% MgO | 99.2% $Al_2O_3$ | 44% $Cr_2O_3$ |
| 1.0% CaO | 0.02% $SiO_2$ | 23% FeO |
| 0.4% $SiO_2$ | 0.03% $Fe_2O_3$ | 13% $Al_2O_3$ |
| 0.2% $Fe_2O_3$ | 0.45% $Na_2O$ | 12% MgO |
| 0.2% $Al_2O_3$ | 0.4% Ignition Loss. | 4% $SiO_2$ |
| 0.5% Ignition Loss. |  | 0.5% CaO |

For the purpose of better illustrating this invention, ten sample refractories of the invention (Casting Nos. 1–10) with their corresponding rated resistance to slag deterioration and modulus of rupture are shown in Table I along with similar data for four sample refractories (Casting Nos. 11–14) not within the invention. The ratings of resistance to slag deterioration are based on an accentuated deterioration test. This test comprises immersing one-half the length of ½″ x ½″ x 1½″ fused cast refractory samples in a molten slag composed of 80% $Fe_2O_3$ and 20% $CaMgSiO_4$ (Monticellite slag) at 1650° C. for 48 hours. The percent change in dimension is measured ½″ below the slag line by comparison of the tested specimen dimension with the known original dimension prior to testing. Correlation of these test results with similar compositions tested in actual furnace service have shown that refractory life becomes intolerably short when a refractory composition exhibits a bursting expansion (plus percent value) in excess of 8% or corrosion-erosion (minus percent value) in excess of about 30%. The ideal resistance to slag deterioration would be rated 0%.

The classification values in Table II are the average of the four bricks of each composition.

*Table II*

| Casting No. | 15 | 16 | 17 | 18 | 19 |
|---|---|---|---|---|---|
| MgO, wt. percent | 64 | 63.7 | 65.5 | 72.6 | 68.6 |
| $Al_2O_3$, wt. percent | 30 | 31.8 | 26.8 | 11.9 | 29.9 |
| $Cr_2O_3$, wt. percent | 3.0 | 2.3 | 4 | 8.8 | |
| FeO, wt. percent | 1.5 | 1.1 | 2.3 | 4.4 | <0.2 |
| CaO, wt. percent | 0.6 | 0.6 | 0.5 | 0.9 | 0.7 |
| $SiO_2$, wt. percent | 0.5 | 0.3 | 0.7 | 1.2 | 0.3 |
| Spalling Classification | 2.0 | 2.1 | 2.0 | 3.9 | 2.7 |

*Table I*

| Casting No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| MgO, wt. percent | 78.4 | 67.7 | 64.7 | 84 | 80 | 79.7 | 74 | 67 | 55.7 | 62.4 | 78.4 | 68.6 | 63.7 | 53.9 |
| $Al_2O_3$, wt. percent | 18.0 | 28.9 | 29.9 | 13 | 15 | 18.8 | 22 | 29 | 39.8 | 32.2 | 20 | 29.9 | 34.9 | 40.8 |
| $Cr_2O_3$, wt. percent | 2 | 2 | 4 | 0.86 | 2.5 | 0.43 | 1.6 | 1.6 | 2.4 | 2 | | | | 4 |
| $FeO^a$, wt. percent | <0.2 | <0.2 | <0.2 | 0.43 | 1.2 | 0.2 | 0.8 | 0.8 | 1.2 | 2.5 | <0.2 | <0.2 | <0.2 | <0.2 |
| CaO, wt. percent | 0.8 | 0.7 | 0.7 | 0.5 | 0.6 | 0.5 | 0.5 | 0.5 | 0.5 | 0.5 | 0.8 | 0.7 | 0.7 | 0.6 |
| $SiO_2$, wt. percent | 0.3 | 0.3 | 0.3 | 0.3 | 0.4 | 0.2 | 0.2 | 0.2 | 0.2 | 0.2 | 0.3 | 0.3 | 0.3 | 0.2 |
| Slag Deterioration, percent | +2.5 | +7 | +5 | +2 | +2 | +5 | | +4 | +6 | +2 | +30 | +9 | −19 | +31 |
| Modulus of Rupture, p.s.i. | 2,200 | 3,400 | 4,100 | 1,200 | 1,800 | 3,600 | 1,700 | 3,100 | | 4,400 | 1,000 | 1,800 | 3,100 | 3,650 | a The total Fe content is included and calculated as being FeO.

Table I clearly illustrates the good resistance to slag deterioration of the refractory of this invention. This can be most significantly illustrated by comparing samples with and without $Cr_2O_3$ but with substantially the same ratio of $MgO:Al_2O_3$, e.g., Casting Nos. 6 and 11, 2 and 12, 10 and 13. A comparison of these same samples also shows the good modulus of rupture for the refractory of the present invention. Moreover, Casting No. 14 illustrates the effect of too low a MgO content whereby the resistance to slag deterioration becomes very poor. The maximum MgO content of the invention refractory is dictated by virtue of the fact that the melting point becomes too high above 85% MgO to obtain proper melting and casting.

Figure 2:
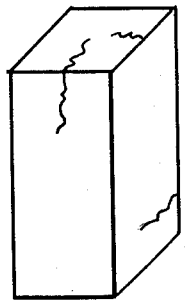
Figure 3:
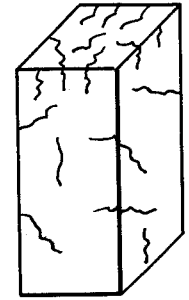
Figure 4:
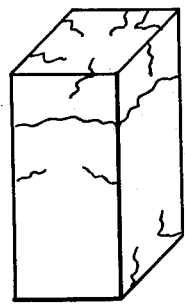
Figure 5:

The high degree of resistance to thermal spalling of the invention refractories can be seen by reference to Table II. Casting Nos. 15, 16 and 17 are examples of the present invention and Casting Nos. 18 and 12 are representative of prior art refractories. The spalling resistance classification is based on an accelerated test simulating the characteristic thermal gradient and cyclic thermal changes that occur in steelmaking furnace refractories. The test consists of heating a panel of four 3″ x 4½″ x 13½″ bricks of each composition to 1250° C., then subjecting the bricks to a programmed thermal cycle consisting of: 2 hours hold at 1250° C., 2 hours heating up to 1650° C., 2 hours hold at 1650° C., 2 hours cooling to 1250° C., and repeating this cycle an additional 59 times for a total of 60 cycles. At the end of 60 cycles, the bricks are cooled to room temperature and classified in accordance with the following scheme:

| Defect Class | Type of Defect | Typical Appearance |
|---|---|---|
| 1 | No cracks | FIGURE 1. |
| 2 | Minor hot face and body cracks | FIGURE 2. |
| 3 | Extensive hot face and body cracks | FIGURE 3. |
| 4 | Tight spall crack | FIGURE 4. |
| 5 | Loose spall | FIGURE 5. |

Thus, it can be seen that the refractory of the present invention provides good resistance to slag deterioration and good modulus of rupture with concomitant high resistance to thermal spalling—a combination of properties heretofore unobtainable in fused cast refractories for service in steelmaking furnaces, such as the electric-arc melting furnaces and the roofs of open hearth furnaces. However, the utility of the invention refractory is not necessarily restricted to the aforementioned applications, but can be used in other applications where deemed desirable, for example, in cement kilns and in the super-structure of glass melting tank furnaces.

It should be understood that the illustrated embodiments of the invention may be varied within the spirit of the invention, and, accordingly, it is intended that the scope of the present invention be limited only by the appended claims.

What is claimed is:

1. A fused cast refractory consisting essentially of, by weight, 56% to 85% MgO, 13% to 40% $Al_2O_3$, the sum of MgO plus $Al_2O_3$ being at least 90%, 0.4% to 4.5% $Cr_2O_3$, up to 3.5% FeO, up to 3% CaO, up to 3% $SiO_2$ and up to 0.5% $B_2O_3$.

2. A fused cast refractory consisting essentially of, by weight, 60% to 75% MgO, 25% to 35% $Al_2O_3$, the sum of MgO plus $Al_2O_3$ being at least 92%, 0.7% to 4% $Cr_2O_3$, up 2.5% FeO, up to 2% CaO, up to 2% $SiO_2$ and up to 0.2% $B_2O_3$.

References Cited in the file of this patent

UNITED STATES PATENTS 2,062,962    Baumann et al.    Dec. 1, 1936
2,235,077    McMullen    Mar. 18, 1941

UNITED STATES PATENT OFFICE
CERTIFICATE OF CORRECTION

July 14, 1964

Patent No. 3,140,955

Allen M. Alper et al.

It is hereby certified that error appears in the above numbered patent requiring correction and that the said Letters Patent should read as corrected below.

In the grant, lines 3 and 13, and in the heading to the printed specification, line 5, for "Cohart Refractories Company", each occurrence, read -- Corhart Refractories Company --; column 1, line 70, for "ot" read -- to --; column 4 Table II, in the heading to the last column thereof, for "19" read -- 12 --.

Signed and sealed this 29th day of December 1964.

(SEAL)
Attest:

ERNEST W. SWIDER
Attesting Officer

EDWARD J. BRENNER
Commissioner of Patents